(12) United States Patent
Reich et al.

(10) Patent No.: US 8,357,304 B2
(45) Date of Patent: Jan. 22, 2013

(54) HAZARDOUS MATERIAL STORAGE AND LEAK MITIGATION SYSTEM

(75) Inventors: Alton Reich, Huntsville, AL (US);
Roberto DiSalvo, Madison, AL (US);
Stephen Doherty, New Hope, AL (US);
H Waite Dykes, Huntsville, AL (US)

(73) Assignee: Streamline Automation, LLC, Huntsville, AL (US)

( * ) Notice: Subject to any disclaimer, the term of this patent is extended or adjusted under 35 U.S.C. 154(b) by 857 days.

(21) Appl. No.: 12/331,715

(22) Filed: Dec. 10, 2008

(65) Prior Publication Data
US 2010/0143040 A1  Jun. 10, 2010

(51) Int. Cl.
*G01N 7/00* (2006.01)
*C02F 1/00* (2006.01)

(52) U.S. Cl. .............. 210/739; 73/31.06; 73/863.81; 73/865.8; 210/749; 210/87; 210/109

(58) Field of Classification Search ............... 220/62.18; 405/129.5; 73/29.01, 31.03; 210/749, 790, 210/805, 307, 85, 103, 141, 143, 739
See application file for complete search history.

(56) References Cited

U.S. PATENT DOCUMENTS

| | | | | |
|---|---|---|---|---|
| 5,265,465 | A * | 11/1993 | Thomas | 73/49.2 |
| 5,588,461 | A * | 12/1996 | Plecnik | 137/312 |
| 2004/0062697 | A1* | 4/2004 | Mortson et al. | 423/235 |
| 2008/0317644 | A1* | 12/2008 | DelGais | 422/168 |

* cited by examiner

*Primary Examiner* — Krishnan S Menon
*Assistant Examiner* — Allison M Gionta
(74) *Attorney, Agent, or Firm* — KIPA AB; Tomas Friend

(57) ABSTRACT

A self-contained storage system for hazardous materials includes a containment envelope enclosing a storage tank containing hazardous materials and forming a containment space between the storage tank and containment envelope. Leaked material is detected by one or more sensors in the containment space and, depending on the concentration or time rate of change in concentration of the leaked material, alarms and corresponding mitigation measures are reversibly activated to remove leaked material from the containment space.

20 Claims, 6 Drawing Sheets

HAZARDOUS MATERIAL STORAGE AND LEAK MITIGATION SYSTEM

STATEMENT REGARDING GOVERNMENT SPONSORED RESEARCH

The U.S. Government has certain rights to this invention pursuant to Contract Number W9113M-08-C-125 awarded by the U.S. Army Space & Missile Defense Command.

CROSS-REFERENCE TO RELATED APPLICATIONS

Not Applicable

BACKGROUND OF THE INVENTION

1. Field of the Invention

The present invention relates to apparatus and methods for the mitigation of and warning against leaks of hazardous liquids and gasses.

2. Related Art

Methods and systems for storing hazardous materials are known. Some systems, such as described in U.S. Pat. No. 4,523,454 are limited to the detection and secondary containment of a leaked fuel such as gasoline. Other systems, exemplified by U.S. Pat. No. 6,578,639, inject a neutralizer directly into a breached fuel tank to chemically neutralize the flammability or other hazardous property of leaking fuel. US 2004/0080424 discloses a flammable gas detection system that detects a flammable gas in an enclosed space, such as a garage.

The existing systems for storing hazardous materials are not adequate for the safe storage and transport of hazardous materials in all circumstances. The storage of hypergolic propellants, especially hypergolic propellant systems comprising both fuel and oxidizer exemplifies the need for new storage and transportation systems. The present invention addresses the need for storage and transportation systems for a wide variety of hazardous materials including chemical, biological, and radiological hazards.

BRIEF DESCRIPTION OF THE INVENTION

In one aspect, the present invention is a system and method for the storage, handling, and transportation of hazardous materials.

In another aspect, the present invention is a system and method for the safe storage, handling, and/or transportation of hypergolic propulsion systems.

In yet another aspect, the present invention is a system and method for mitigating a hazard created by the leakage of a hazardous material from a storage container and warning personnel of the leakage and its severity.

The present storage and leak mitigation system uses a containment envelope to isolate the stored material from the surrounding environment. One or more sensors detect the presence of material leaked from a storage tank into a containment space between the storage tank and the containment envelope. The containment space is in fluid communication with means for mitigating a leak of stored material. The sensor(s) can be set to reversibly activate one or more alarms and one or more means of leak mitigation based upon the concentration or time rate of change of concentration of material detected in the containment space. Mitigation may include recirculating a gas between the containment space and a scrubber and/or introducing a mitigating fluid into the containment space. The mitigating fluid can be removed to a waste storage container or recirculated between the containment space and a mitigating fluid supply.

DETAILED DESCRIPTION OF THE INVENTION

The system is described using a number of embodiments as examples. While storage of ammonia and hypergolic propellants are used to illustrate various aspects of the invention, it is to be understood that the present invention may be used to contain and transport a wide variety of materials posing a wide variety of hazards, including corrosive, oxidation, flammable, toxic, and biological hazards.

As used herein, the term "to chemically neutralize" is to be understood as to render a hazardous chemical substantially less hazardous by a chemical reaction between the hazardous chemical and another chemical.

As used herein, a "hazardous" material is a material that poses a hazard, including one or more of toxicity, biological, corrosive, inflammability, and explosive hazards.

Figure 1:
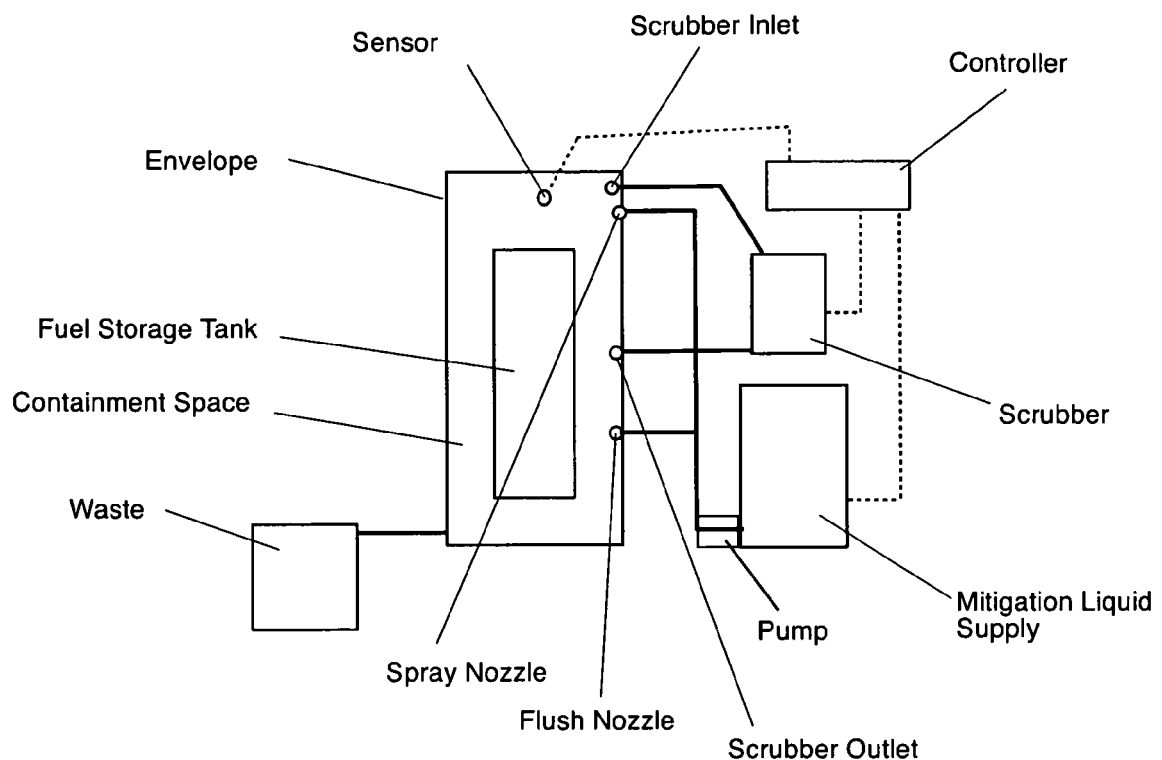
FIG. 1 is a schematic of a first embodiment of the invention.
Figure 2:
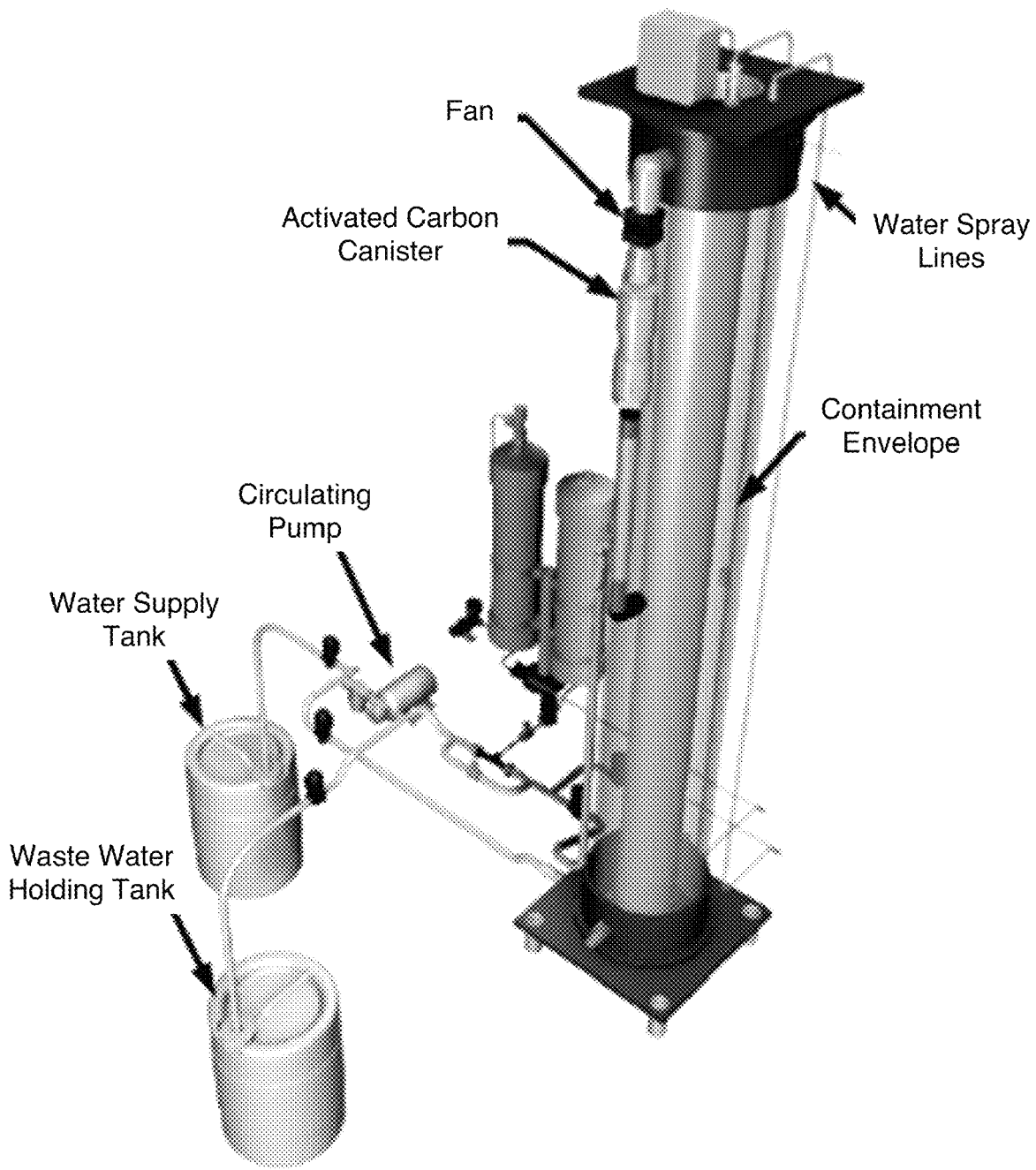
FIG. 2 is an illustration of a first embodiment of the invention.

FIG. 1 illustrates a system configured to contain and neutralize the leak of hazardous gas or liquid from a storage tank, such as a fuel tank. The system comprises a containment envelope surrounding a stored hazardous material to form a containment space, one or more sensors for detecting and reporting the concentration of hazardous vapor in the containment space, and a control unit. The one more sensors record the concentration of the hazardous vapor in a time dependent manner and communicate with an audible and/or visible alarm directly, or via the control unit. Any or all data, including raw output from sensors, may be made available to an external or remote monitoring system. In this embodiment, the system comprises a scrubber and a supply of mitigating fluid. The scrubber comprises a material that absorbs, sequesters, or chemically neutralizes the hazardous vapor and a fan, blower, or other means for recirculating gas between the containment space and the scrubber via a scrubber inlet and a scrubber outlet in the containment envelope. The supply of mitigating liquid comprises a pump, pressure source, or other means for moving the liquid from the liquid supply to the containment space. The mitigating liquid enters the containment space through a nozzle that may be configured to deliver the liquid to the containment space as a fine spray or at a high flow rate, or flush. The mitigating liquid in the containment space may be drained into a waste storage tank or pumped to a chamber where the hazardous vapor absorbed by the liquid is extracted or chemically neutralized and returned to the mitigating liquid supply. The scrubber may comprise a mitigating liquid that is used to remove or chemically neutralize vapor from the containment space. The scrubber may alternatively, or additionally, comprise a solid sorbent to remove vapor from the gas or a solid catalyst or reactant to chemically neutralize vapor from the containment space. FIG. 2 illustrates an operating containment system corresponding to the schematic shown in FIG. 1. The storage and mitigation system may be stationary or mobile.

Figure 3:
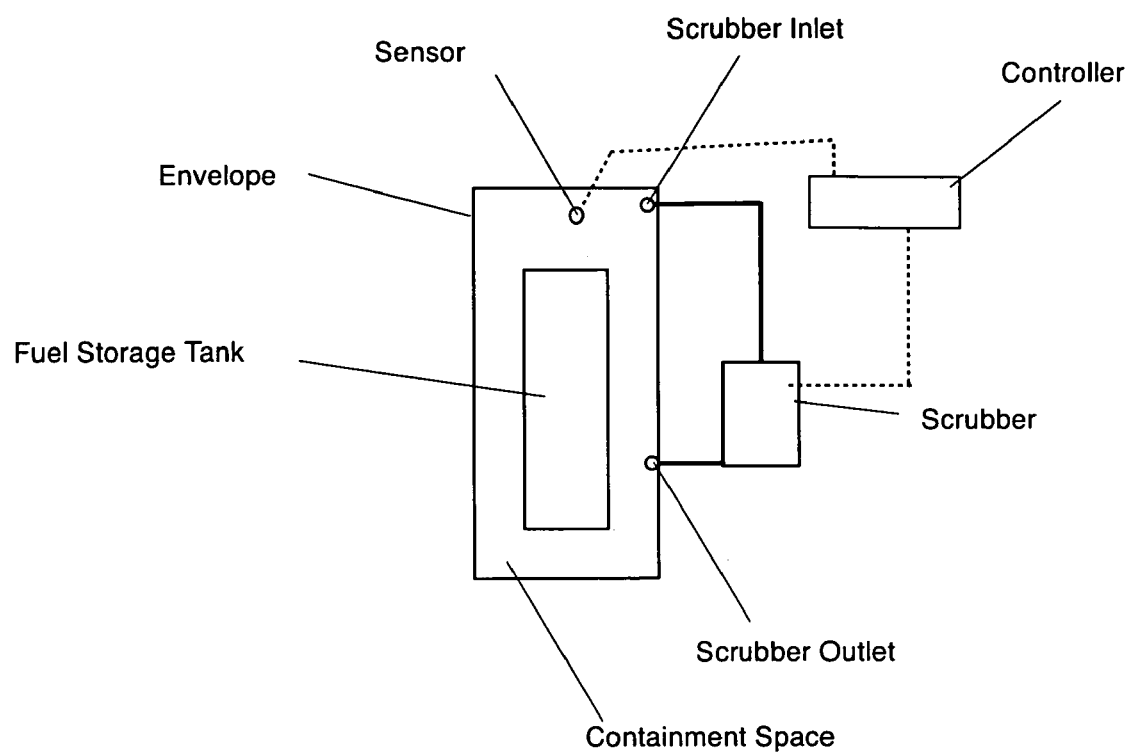
FIG. 3 is a schematic of a second embodiment of the invention.

For some applications, direct contact between mitigating fluid and the hazardous material storage tank may not be desirable. A containment and mitigation system comprising a scrubber but no flush or spray nozzle is shown in FIG. 3. This embodiment of the invention employs one or more scrubbers to remove hazardous material from the containment space. The scrubbers may use chemicals in a solid form such as packed beads to absorb or chemically neutralize the hazardous material. Alternatively, the scrubbers may use a mitigating fluid such as a gas or aerosolized liquid to remove or chemically neutralize hazardous material removed form the containment space. The mitigating fluid is preferably contained within a sealed circulation system. The mitigating fluid used in the scrubber may itself be scrubbed by a separate system (not shown) or used and stored in a waste container (not shown).

Figure 4:
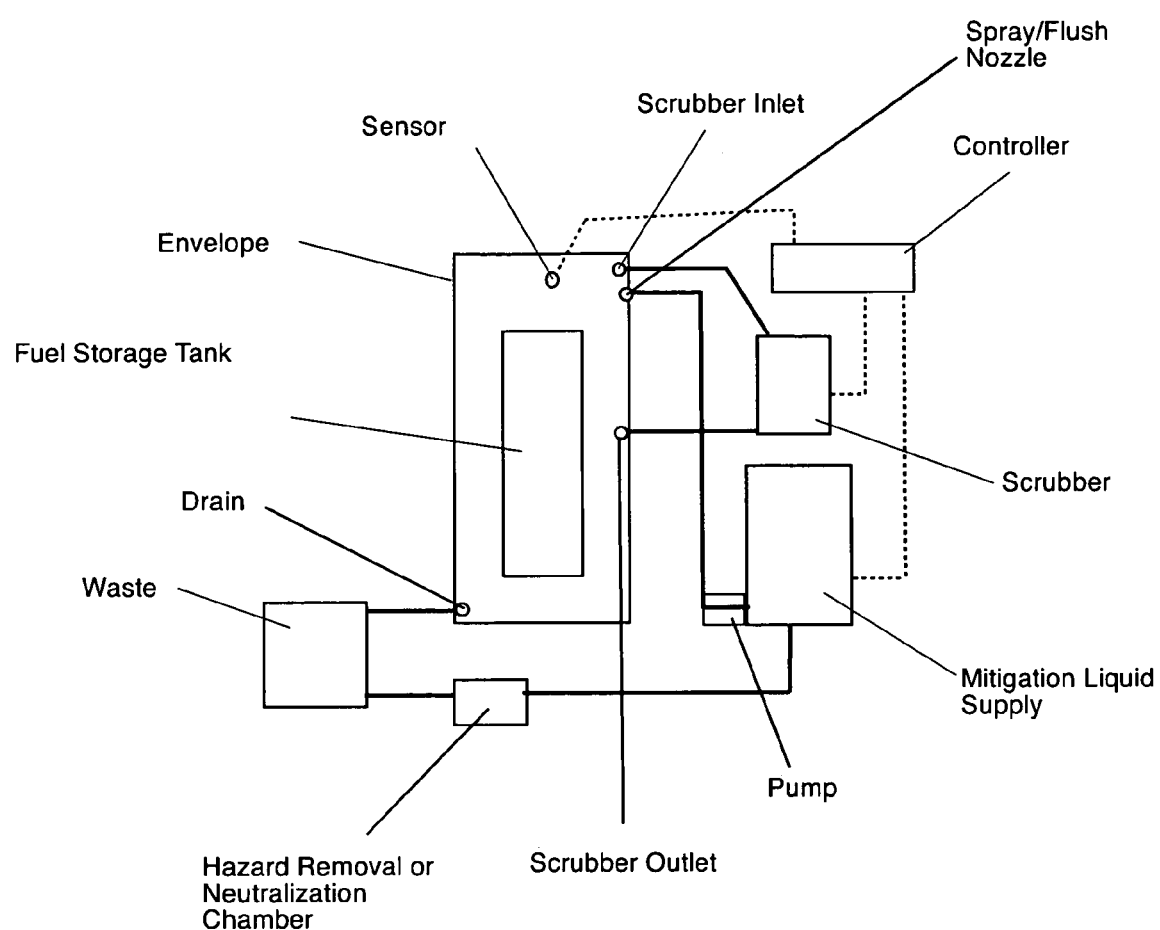
FIG. 4 is a schematic of a third embodiment of the invention.

FIG. 4 shows an embodiment of the invention comprising a scrubber and a mitigating fluid delivery system as shown in FIG. 1, but includes a mitigating fluid scrubber system, which removes or chemically neutralizes hazardous material or reaction products of hazardous material neutralization. The mitigating fluid may be a liquid or a gas. If the mitigating fluid is a liquid, the containment envelope may comprise a single delivery nozzle configured to deliver mitigating fluid in the form of a spray or at a high flow rate to flush the containment space. Alternatively, the containment envelope may comprise separate spray and flush nozzles. If the mitigating fluid is a gas, a single nozzle may be configured to deliver the gas at a low rate corresponding to a liquid spray or at a high rate corresponding to a liquid flush, or two separate nozzles may be used. In some embodiments, such as those used to store large or multiple storage tanks, multiple spray/flush, spray, and/or flush nozzles may be used. The shapes, sizes, orientations, and number of containment envelopes and storage tanks contained within the containment envelope, numbers and locations of sensors, nozzles, and scrubber inlets and outlets can be modified according to need.

Figure 5:
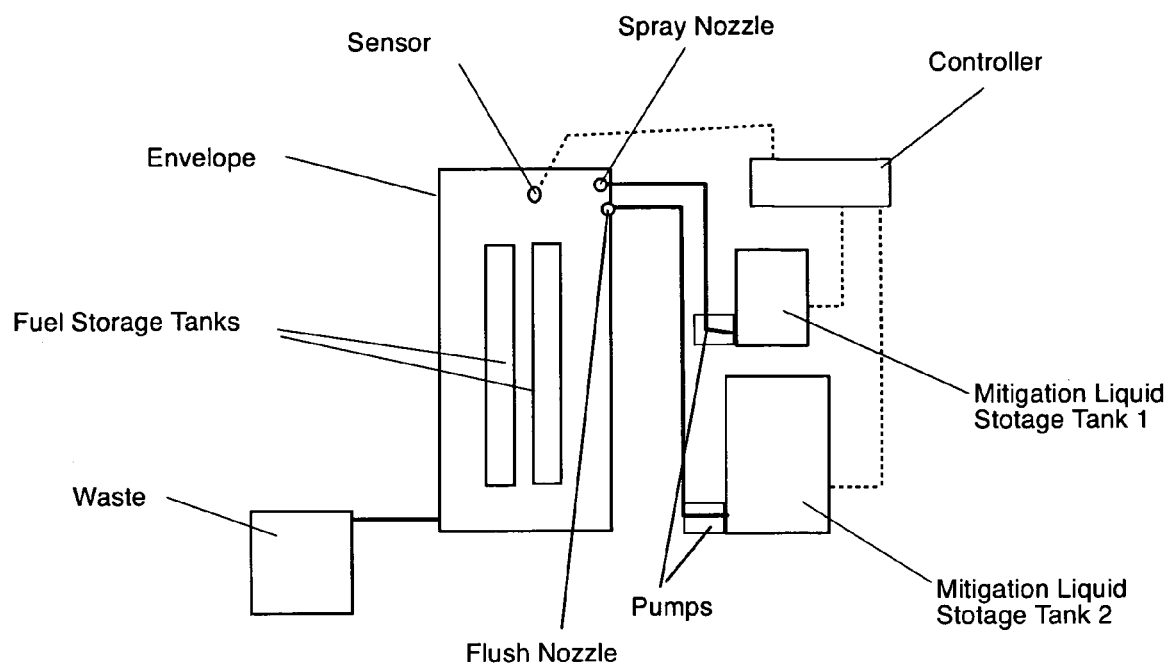
FIG. 5 is a schematic of a fourth embodiment of the invention.

Some applications of the present invention may require the use of more than one mitigating fluid, possibly in combination with one or more scrubbers. These applications may also require the use of multiple sensors or a single sensor capable of detecting more than one hazardous material. FIG. 5 is a schematic of a containment and mitigation system containing two hazardous material storage tanks and two mitigating fluid supplies. A system as shown in FIG. 5 is particularly useful for storing two or more hazardous materials in immediate proximity of one another, such as hypergolic bipropellants contained within a bipropellant propulsion system.

Parts or all of the containment and mitigation system can be configured for portability. If the storage tank(s) is small enough, the entire system may be made portable. Additionally, the storage tank(s) and containment envelope may be configured to be separable from the remainder of the system so that the control and mitigation systems can be transferred from one storage envelope to another. Embodiments of this type would include couplings allowing reversible, secure fluid connection between one or more scrubbers and/or mitigating fluid supplies and the containment space.

EXAMPLE 1

The system shown in FIG. 1 is configured for ammonia storage and containment and comprises an ammonia sensor located in the containment space. The scrubber comprises a reductively activated carbon sorbent that absorbs gaseous ammonia. A dynamically balanced blower designed to deliver 56 cubic feet per minute is configured to remove air and leaked ammonia vapor from the containment space, pass it through the absorption chamber and return air to the containment space. The mitigating fluid comprises an aqueous solution of sodium hydroxymethanesulfinate dihydrate, which chemically reduces ammonia to form less toxic ammonium ions. The control unit comprises programmable logic chip or computer, relay outputs that switch power to pumps and valves in the system, and a small touchscreen display as a user interface.

The controller is programmed to activate three different levels of mitigation corresponding to three predetermined ammonia concentrations in the containment space. At a concentration of 10 ppm, the controller activates a fan in the scrubber system. At a concentration of 60 ppm, the controller activates a pump in the mitigating fluid supply system, which delivers mitigating fluid into the containment space through a spray nozzle. At a concentration of 90 ppm, the controller activates a pump in the mitigating fluid supply system, which delivers mitigating fluid into the containment space through a flush nozzle, which floods the containment space with mitigating fluid. Three audible and/or visual alarms may be correlated to sensor readings corresponding to each of the predetermined ammonia concentrations. Once a mitigation to an ammonia leak is activated, it may be reversed when the concentration of ammonia in the containment space is reduced below the predetermined value that triggered the mitigation.

The variable response of the containment system to increasing concentrations of hazardous material provides several advantages over the prior art. In this example, the time dependent measure of ammonia concentration allows an initial assessment of the severity of an ammonia leak. For slow leaks, the recirculation of air in the containment space through the absorption chamber mitigates the leak and informs personnel of the leak and need for storage tank repair and transfer of the ammonia to another storage tank. For more severe leaks, the containment system provides two additional levels of mitigation that provide initial containment and mitigation while warning personnel of the severity of the leak and possibly providing time for personnel to evacuate the area. The severity of the leak, as indicated by the concentration of or time rate of concentration of ammonia in the containment space, may be indicated using different alarm states indicated by different audible and/or visual alarm signals.

The containment and mitigation system described in this example is a sealed system in which no vapor escaping the storage tank escapes the system. In some embodiments, it may be desirable to allow gas or fluid containing neutralized hazardous material to escape the system.

EXAMPLE 2

The system shown in FIG. 3 is configured to store Momomethylhydrazine (MMH), a hypergolic fuel commonly used in combination with a Mixed Oxide of Nitrogen (MON) oxidizer for propulsion in rockets and attitude control systems in spacecraft. In this embodiment, a hydrazine sensor is used in a time dependent mode to indicate MMH concentration as well as time rate of change. The scrubber uses solid calcium hypchlorite, citric acid, a catalyst, an aqueous solution of sodium hypochlorite, citric acid, peroxide, or ozone, or gaseous ozone to chemically neutralize, the MMH. The scrubber may also be configured to use a sorbent to sequester the MMH in addition to, or as an alternative to chemical neutralization.

The scrubber may be configured, for example, as an eductor-style scrubber, a one-stage counter-current scrubber, a two-stage counter-current scrubber, or a cross-current packed bed chemical scrubber.

The control unit for this application preferably comprises a large touchscreen display and audible as well as visible alarms. In this example, the control unit is programmed to activate the scrubber when the MMH concentration in the containment space reaches 300 ppm. The predetermined concentration, however, may be set to any selected value. Because hydrazine is a highly reactive chemical, the gas in the containment space of this embodiment is preferably a chemically inert gas such as nitrogen or argon. The gas may optionally be recirculated within the containment space using a fan or other means (not shown) to distribute leaked MMH to ensure rapid contacting of leaked MMH with the senor.

EXAMPLE 3

The system shown in FIG. 3 is configured for the storage of Mixed Oxides of Nitrogen (MONS). In this embodiment, a NOx sensor is used in a time dependent mode to indicate NOx concentration as well as its time rate of change. The scrubber uses a solid sodium or calcium salt of hydroxide, carbonate, or bicarbonate to chemically neutralize MON delivered to the scrubber from the containment space. The scrubber may, additionally or alternatively, use a mitigating fluid comprising an aqueous solution of hydroxide, carbonate, or bicarbonate ion to chemically neutralize the MON. As an example, the control is programmed to activate audible and/or visible alarms and the scrubber system when the concentration of MON in the containment space reaches 100 ppm.

For the embodiments described in examples 2 and 3, the activation of alarms and scrubbers is reversible such that, when the concentration of the hazardous gas in the containment space is reduced to a second predetermined value that is equal to or less than the first predetermined concentration, mitigation and, optionally, alarm activation is stopped.

EXAMPLE 4

Figure 6:
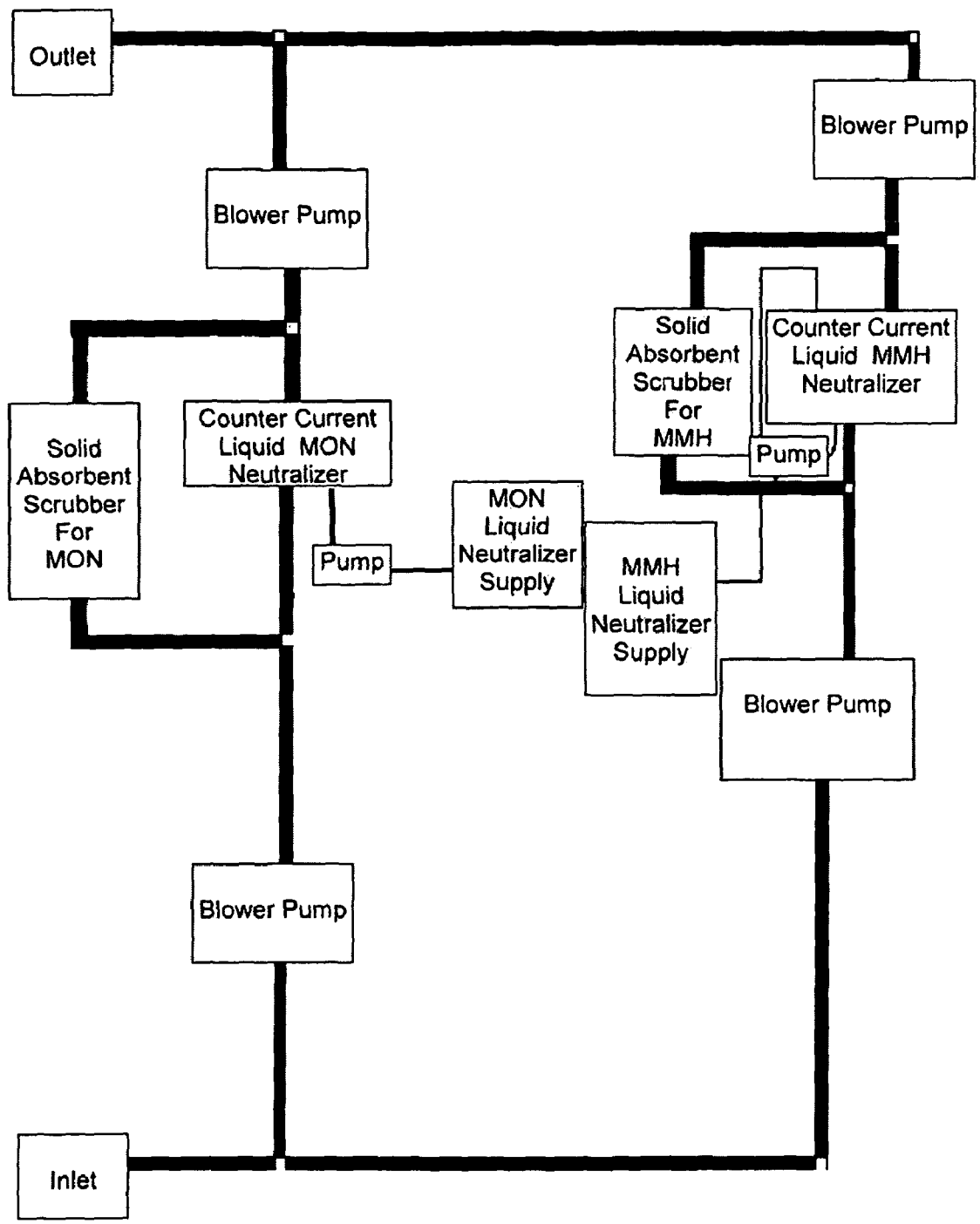
FIG. 6 is a schematic of a scrubber for an embodiment of the invention designed specifically for the storage of a hypergolic propulsion system.

The system shown in FIG. 5 is configured such that the containment envelope contains two hypergolic propellant storage tanks, one containing MMH and one containing MON. The system comprises two sensors configured to detect propellant in the containment space, one for MMH and one for MON (NOx). A single scrubber system is configured as shown in FIG. 6 to include two sorbent and two chemically neutralizing scrubbers, one for each hazardous material.

What is claimed is:

1. A system for storing a hazardous material comprising:
a first sealed storage tank containing the hazardous material,
a containment envelope enclosing the first storage tank and forming a containment space between the storage tank and the containment envelope,
a first sensor configured to detect a concentration of hazardous material in the containment space,
a first supply of mitigating fluid capable of sequestering or chemically neutralizing the first hazardous material,
a pump configured to deliver the first mitigating fluid to the containment space, and
a controller in communication with the first sensor and the pump
wherein:
the containment envelope comprises a spray nozzle and a flush nozzle in fluid communication with the first supply of mitigating fluid and a drain configured to allow the mitigating fluid to exit the containment space and enter into a waste container or a recirculation system;
said spray nozzle is configured to deliver mitigating fluid to the containment space as a spray;
said flush nozzle is configured to provide mitigating fluid at a higher flow rate than said spray nozzle;
and
the controller is configured such that the pump is operated to deliver mitigating fluid from the first supply of first mitigating fluid through the spray nozzle and into the containment space when the sensor detects a first predetermined concentration of the first hazardous material in the containment space and the pump is operated to deliver mitigating fluid from the first supply of first mitigating fluid through the flush nozzle and into the containment space when the first sensor detects a second predetermined concentration of the first hazardous material in the containment space.

2. The system of claim 1, and further comprising:
a scrubber comprising a material capable of sequestering or chemically neutralizing the first hazardous material and in fluid contact with the containment space,
means for recirculating a gas between the containment space and the scrubber, and wherein:
the controller is configured to activate the means for recirculating said gas between the containment space and the scrubber when the first sensor detects a third predetermined concentration of the first hazardous material in the containment space.

3. The system of claim 1, wherein the controller is configured to deactivate the delivery of mitigating fluid from the first supply of first mitigating fluid to the containment space when the concentration of hazardous material in the containment space falls below a predetermined value.

4. The system of claim 1, further comprising audible and visible alarms in communication with the controller.

5. The system of claim 1, wherein the hazardous material is a liquid or a compressed or liquefied gas.

6. The system of claim 1, wherein the containment envelope further encloses a second sealed storage tank containing a second hazardous material, said second hazardous material being different from said first hazardous material, and a sensor configured to detect a concentration of the second hazardous material, and
said system further comprises a second supply of a second mitigating fluid, and wherein:
the controller is configured to:
deliver said first mitigating fluid to the spray nozzle when the first sensor detects a first predetermined concentration of the first hazardous material in the containment space;
deliver said first mitigating fluid to the flush nozzle when the first sensor detects a second predetermined concentration of the first hazardous material in the containment space;
deliver said second mitigating fluid to the spray nozzle when the second sensor detects a first predetermined concentration of the second hazardous material in the containment space; and
deliver said second mitigating fluid to the flush nozzle when the second sensor detects a second predetermined concentration of the second hazardous material in the containment space.

7. The system of claim 6, wherein:
the first and second hazardous materials combine to form one or more products that are more toxic than the first and second hazardous materials or
the first and second hazardous materials, when combined, form a flammable or explosive mixture.

8. A system for storing a hazardous material comprising:
a first sealed storage tank containing a first hazardous material,
a containment envelope enclosing the first storage tank and forming a containment space between the first storage tank and the containment envelope,
a first sensor configured to detect a concentration of a first hazardous material in the containment space,
an alarm,
a first scrubber comprising a material capable of sequestering or chemically neutralizing the first hazardous material and in fluid communication with the containment space,
a means for recirculating a gas between the containment space and the first scrubber, and
a controller in communication with the first sensor, the alarm, and the means for recirculating gas through the scrubber
wherein:
the controller is configured to activate an alarm and means for recirculating a gas between the containment space and the first scrubber when the first sensor detects a first predetermined concentration of said first hazardous material in the containment space and to deactivate means for recirculating a gas between the containment space and the first scrubber when the first sensor detects a second predetermined concentration of said first hazardous material in the containment space and
the second predetermined concentration of said first hazardous material is less than or equal to the first predetermined concentration of said first hazardous material.

9. The system of claim 8, wherein the means for recirculation of gas between the containment space and the first scrubber comprises a fan or a blower.

10. The system of claim 8, wherein the first scrubber is selected from the group consisting of an eductor-style scrubber, a one-stage counter-current scrubber, a two-stage counter-current scrubber, and a cross-current packed bed chemical scrubber.

11. The system of claim 8, wherein the first scrubber comprises a mitigating fluid supply.

12. The system of claim 8, wherein the containment envelope further encloses a second storage tank containing a second hazardous material, said second hazardous material being different from said first hazardous material, and said system further comprises a sensor configured to detect a concentration of the second hazardous material, a second scrubber, and a means for recirculating a gas between the containment space and the second scrubber and wherein:
the controller is further configured to activate said means for recirculating a gas between the containment space and the second scrubber when the second sensor detects a first predetermined concentration of the second hazardous material in the containment space and to deactivate said means for recirculating a gas between the containment space and the second scrubber when the second sensor detects a second predetermined concentration of the second hazardous material in the containment space and
the second predetermined concentration of the second hazardous material is less than or equal to the first predetermined concentration of the second hazardous material.

13. The system of claim 12, wherein the first hazardous material is hydrazine or monomethylhydrazine; the second hazardous material is a mixed oxide of nitrogen; the first sensor is a hydrazine or monomethylhydrazine sensor; the second sensor is a mixed oxide of nitrogen sensor; the first scrubber comprises solid calcium hypchlorite, citric acid, a catalyst, an aqueous solution of sodium hypochlorite, citric acid, peroxide, or ozone, or gaseous ozone; and the second scrubber comprises a solid sodium or calcium salt of hydroxide, carbonate, or bicarbonate.

14. The system of claim 8, wherein the gas recirculating between the containment space and the scrubber is a chemically inert gas.

15. The system of claim 8, and further comprising:
a supply of mitigating fluid that sequesters or chemically neutralizes the hazardous material,
a pump configured to deliver said mitigating fluid to the containment space, and wherein:
the containment envelope comprises: a spray nozzle and a flush nozzle in fluid communication with the supply of mitigating fluid and a drain configured to allow mitigating fluid to exit the containment space and enter into a waste container or recirculation system;
the controller is in communication with the pump and configured to deliver mitigating fluid from said supply of mitigating fluid to the spray nozzle when the first sensor detects a third predetermined concentration of said first hazardous material in the containment space and to deliver mitigating fluid from said supply of mitigating fluid to the flush nozzle when the first sensor detects a fourth predetermined concentration of hazardous material in the containment space.

16. The system of claim 1, wherein the spray nozzle and the flush nozzle are embodied as a single nozzle configured to deliver mitigating fluid in the form of a spray or to flush the containment space.

17. The system of claim 1, wherein said first sensor records the concentration of a hazardous vapor in a time dependent manner.

18. The system of claim 6, wherein said sensor configured to detect a concentration of the second hazardous material is a second sensor separate from said sensor configured to detect a concentration of the first hazardous material.

19. The system of claim 8, wherein said first sensor records the concentration of a hazardous vapor in a time dependent manner.

20. The system of claim 12, wherein said sensor configured to detect a concentration of the second hazardous material is a second sensor separate from said sensor configured to detect a concentration of the first hazardous material.

* * * * *